(12) United States Patent
Tsuda et al.

(10) Patent No.: US 11,724,534 B2
(45) Date of Patent: Aug. 15, 2023

(54) PEN

(71) Applicant: KURETAKE CO., LTD., Nara (JP)

(72) Inventors: Miyoko Tsuda, Nara (JP); Makiko Morimoto, Nara (JP)

(73) Assignee: KURETAKE CO., LTD., Nara (JP)

( * ) Notice: Subject to any disclaimer, the term of this patent is extended or adjusted under 35 U.S.C. 154(b) by 71 days.

(21) Appl. No.: 17/614,245

(22) PCT Filed: May 26, 2020

(86) PCT No.: PCT/JP2020/020730
§ 371 (c)(1),
(2) Date: Nov. 24, 2021

(87) PCT Pub. No.: WO2020/241634
PCT Pub. Date: Dec. 3, 2020

(65) Prior Publication Data
US 2022/0219481 A1    Jul. 14, 2022

(30) Foreign Application Priority Data

May 30, 2019   (JP) .................................. 2019-101377

(51) Int. Cl.
| | |
|---|---|
| *B43K 8/14* | (2006.01) |
| *B43K 8/00* | (2006.01) |
| *B43K 1/12* | (2006.01) |
| *B43K 1/00* | (2006.01) |
| *A45D 34/04* | (2006.01) |
| *C09D 11/17* | (2014.01) |

(52) U.S. Cl.
CPC .............. *B43K 8/143* (2013.01); *B43K 8/003* (2013.01); *B43K 8/146* (2013.01); *C09D 11/17* (2013.01); *A45D 34/04* (2013.01); *B43K 1/003* (2013.01); *B43K 1/006* (2013.01); *B43K 1/12* (2013.01)

(58) Field of Classification Search
CPC ........ B43K 8/143; B43K 8/003; B43K 8/146; B43K 1/003; B43K 1/006; B43K 1/12; B43K 5/005; B43K 5/02; B43K 5/1809; C09D 11/16; C09D 11/17; C09D 11/32; A45D 34/04
USPC ......................................... 401/198, 199, 195
See application file for complete search history.

(56) References Cited

U.S. PATENT DOCUMENTS

| | | | |
|---|---|---|---|
| 3,095,343 | A | 6/1963 | Berger |
| 5,607,766 | A | 3/1997 | Berger |
| (Continued) | | | |

FOREIGN PATENT DOCUMENTS

| | | | |
|---|---|---|---|
| JP | S6274472 A | 4/1987 | |
| JP | H860065 A | 3/1996 | |
| (Continued) | | | |

*Primary Examiner* — David J Walczak
(74) *Attorney, Agent, or Firm* — The Webb Law Firm (57) ABSTRACT

A is a pen including: an ink reservoir that stores an ink including decorative particles and a pen tip section. The ink reservoir includes a tubular casing member having liquid blocking properties and an ink occlusion material disposed inside the casing member. The casing member has a first opening end and a second opening end. The ink occlusion material includes multiple fibers disposed in the casing member and the multiple fibers respectively having one ends and other ends each disposed at a position corresponding to the first opening end or the second opening end of the casing member.

8 Claims, 9 Drawing Sheets

(56) References Cited

U.S. PATENT DOCUMENTS

| | | | | |
|---|---|---|---|---|
| 6,224,284 B1* | 5/2001 | Sukhna | ............... | C09D 11/17 |
| | | | | 401/196 |
| 2003/0129015 A1* | 7/2003 | Sexton | ............... | C09D 11/17 |
| | | | | 401/199 |
| 2005/0095055 A1* | 5/2005 | Kwan | ............... | B43K 8/02 |
| | | | | 106/31.28 |
| 2006/0263144 A1 | 11/2006 | Wang | | |
| 2009/0047056 A1 | 2/2009 | Akiyama | | |

FOREIGN PATENT DOCUMENTS

| | | | |
|---|---|---|---|
| JP | H11507994 | A | 7/1999 |
| JP | 2005342950 | A | 12/2005 |
| WO | 2017033555 | A1 | 3/2017 |

* cited by examiner

PEN

CROSS-REFERENCE TO RELATED APPLICATIONS

This application is the United States national phase of International Application No. PCT/JP2020/020730 filed May 26, 2020, and claims priority to Japanese Patent Application No. 2019-101377 filed May 30, 2019, the disclosure of which are hereby incorporated by reference in their entirety.

BACKGROUND OF THE INVENTION

Field of the Invention

The present invention relates to a pen used as a writing instrument or a makeup instrument.

Description of Related Art

A conventional pen used as a writing instrument or a makeup instrument includes an ink reservoir that stores an ink, and a pen tip section, to which the ink is supplied from the ink reservoir, for applying the ink to an ink application object.

There are various types of the ink reservoir. One of the various types of the ink reservoir includes a tubular casing member having liquid blocking properties and a cotton body having liquid absorption properties filled in the casing member (see, for example, Patent Literature 1).

In this type of ink reservoir, the casing member has a first opening end and a second opening end opposite to the first opening end in a direction in which the center axis of the casing member (its center axis) extends (this direction will be hereinafter referred to as the axial direction of the pen). The casing member is disposed with the first opening end facing the pen tip section.

The cotton body includes multiple fibers each having a length shorter than the entire length of the casing member in the axial direction of the pen. The multiple fibers are entangled with each other in the casing member to form minute spaces among the fibers. With this configuration, the ink is held among the fibers (in the minute spaces) and supplied to the pen tip section by the capillary action.

Thereby, this type of pen that causes the pen tip section to be brought into contact with the ink application target can continuously apply the ink to the ink application target.

Meanwhile, some of this type of pen include an ink reservoir that stores an ink including decorative particles having reflectivity or glossiness. According to such a pen, the decorative particles included in the ink are together applied to the application target when the ink is applied to the application target. Accordingly, decorativeness of the application target applied with the ink is enhanced.

However, the amount of supply of decorative particles to the pen tip section in this type of pen is reduced as the pen is being used. Specifically, since the multiple fibers forming the cotton body of the ink reservoir have a length shorter than the entire length of the casing member, this type of pen has ends (end faces) of the fibers at multiple locations.

Therefore, the decorative particles included in the ink caught by the end faces of the fibers in the casing member when the ink is supplied to the pen tip section cannot reach the pen tip section.

Accordingly, this type of pen has a problem in that the number of decorative particles applied to the application target is reduced compared with the beginning of the use since the amount of supply of the decorative particles to the pen tip section is reduced as the pen is being used.

CITATION LIST

Patent Literature

Patent Literature 1: JP 2005-342950 A

SUMMARY OF THE INVENTION

Technical Problem

It is therefore an object of the present invention to provide a pen capable of enabling, even for an ink including decorative particles, a stable supply of the ink together with the decorative particles to a pen tip section.

Solution to Problem

The pen as an embodiment of the present invention includes: an ink reservoir that stores an ink including decorative particles; and a pen tip section to which the ink is supplied from the ink reservoir; the ink reservoir including a tubular casing member having liquid blocking properties, and an ink occlusion material disposed inside the casing member; the casing member having a first opening end and a second opening end opposite to the first opening end in a direction in which a center axis of the casing member extends, in which the first opening end is disposed to face the pen tip section; the ink occlusion material including multiple fibers disposed inside the casing member; the multiple fibers respectively having one ends disposed at a position corresponding to the first opening end or the second opening end of the casing member; and the multiple fibers respectively having other ends disposed at a position corresponding to the first opening end or the second opening end of the casing member.

As one form of the present invention, it may be configured such that the multiple fibers extend in the same direction as that of the center axis of the casing member, the one ends of the multiple fibers are disposed at the position corresponding to the first opening end, and the other end of the multiple fibers are disposed at the position corresponding to the second opening end.

Specifically, since the multiple fibers extend in the same direction as that of the center axis of the casing member, minute spaces formed among the fibers extend in the same direction as that of the center axis of the casing member. That is, the minute spaces formed among the fibers extend along the fibers.

Effect

As described above, the present invention can produce an excellent effect of enabling, even for an ink including decorative particles, a stable supply of the ink together with the decorative particles to the pen tip section.

DESCRIPTION OF THE INVENTION

Hereinafter, an embodiment of the present invention will be described with reference to the attached drawings.

Figure 1:
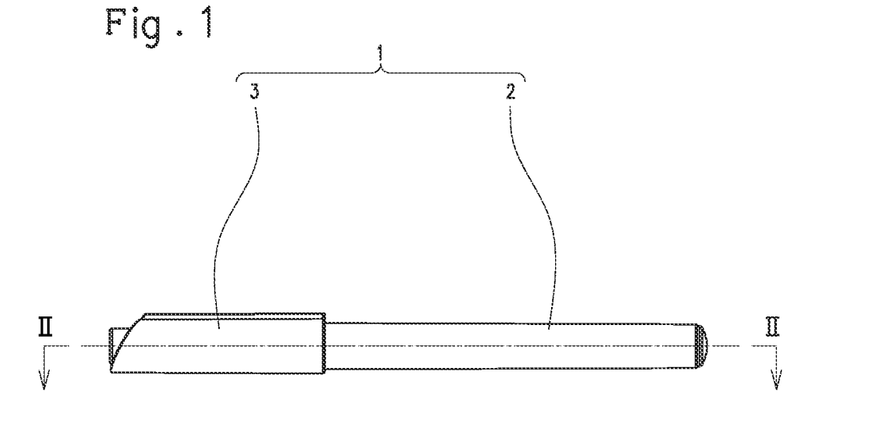
FIG. 1 is an appearance view of a pen according to an embodiment of the present invention.
Figure 2:
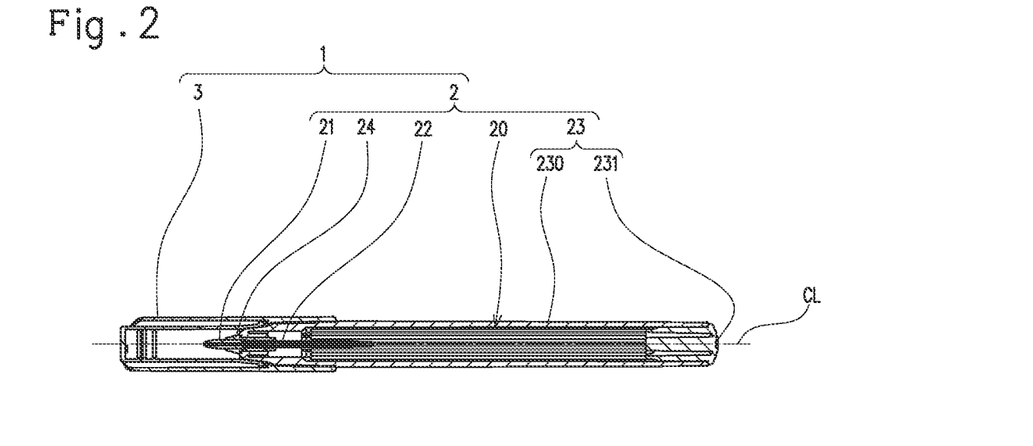
FIG. 2 is a cross-sectional view of the pen according to the embodiment taken along a line II-II in FIG. 1.
Figure 3:
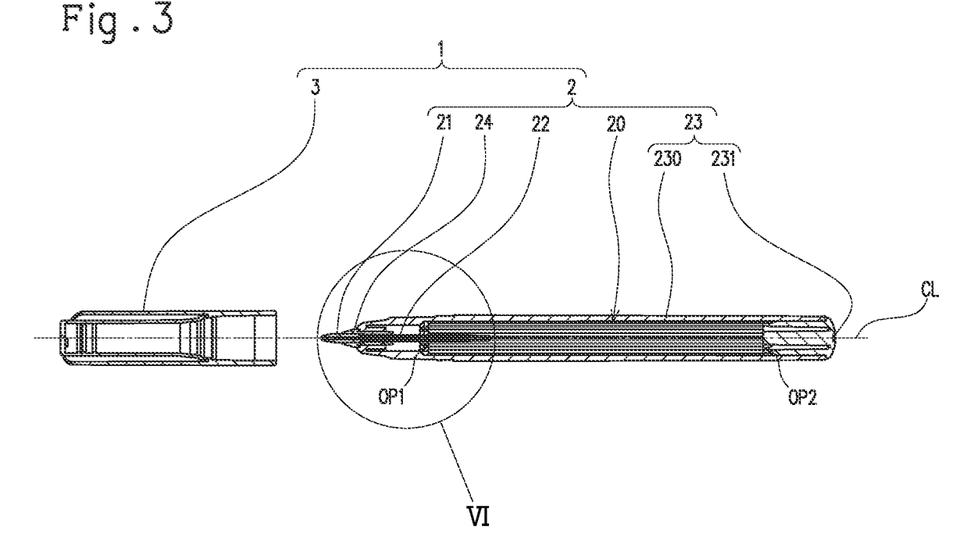
FIG. 3 is a cross-sectional view of the pen according to the embodiment taken along a line II-II in FIG. 1, in which a cap is removed from a pen body.

As shown in FIG. 1 to FIG. 3, the pen according to this embodiment includes a pen body 2 that includes a pen tip section 21 that applies an ink to an ink application target (see FIG. 2 and FIG. 3) and a cap 3 that covers the pen tip section 21 of the pen body 2.

As shown in FIG. 2 and FIG. 3, the pen body 2 includes an ink reservoir 20 that stores an ink including decorative particles (hereinafter simply referred to as the ink) and the pen tip section 21 to which the ink is supplied from the ink reservoir 20.

More specifically, the pen body 2 includes the ink reservoir 20 that stores the ink, the pen tip section 21 to which the ink is supplied from the ink reservoir 20, an ink guide part 22 that guides the ink from the ink reservoir 20 to the pen tip section 21, an outer covering 23 forming an outer shell of the pen body 2, and a holder 24 that holds the pen tip section 21. The outer covering 23 is configured to house the ink reservoir 20 and the ink guide part 22. The holder 24 is attached to the outer covering 23. In this embodiment, the ink includes a montmorillonite-based thickener. The decorative particles included in the ink employed herein are composed of, for example, glass, mineral, metal, fiber, or resin in fine powder form, fine particulate form, or fine flake form. In this embodiment, the decorative particles included in the ink have reflectiveness or glossiness. More specifically, glass formed into a scale form (so-called glass flakes) is employed as the decorative particles included in the ink. With this configuration, the decorative particles reflect the light like a glittering material to enhance the decorativeness, and thus the ink according to this embodiment is also referred to as an ink with glitter.

Figure 4:
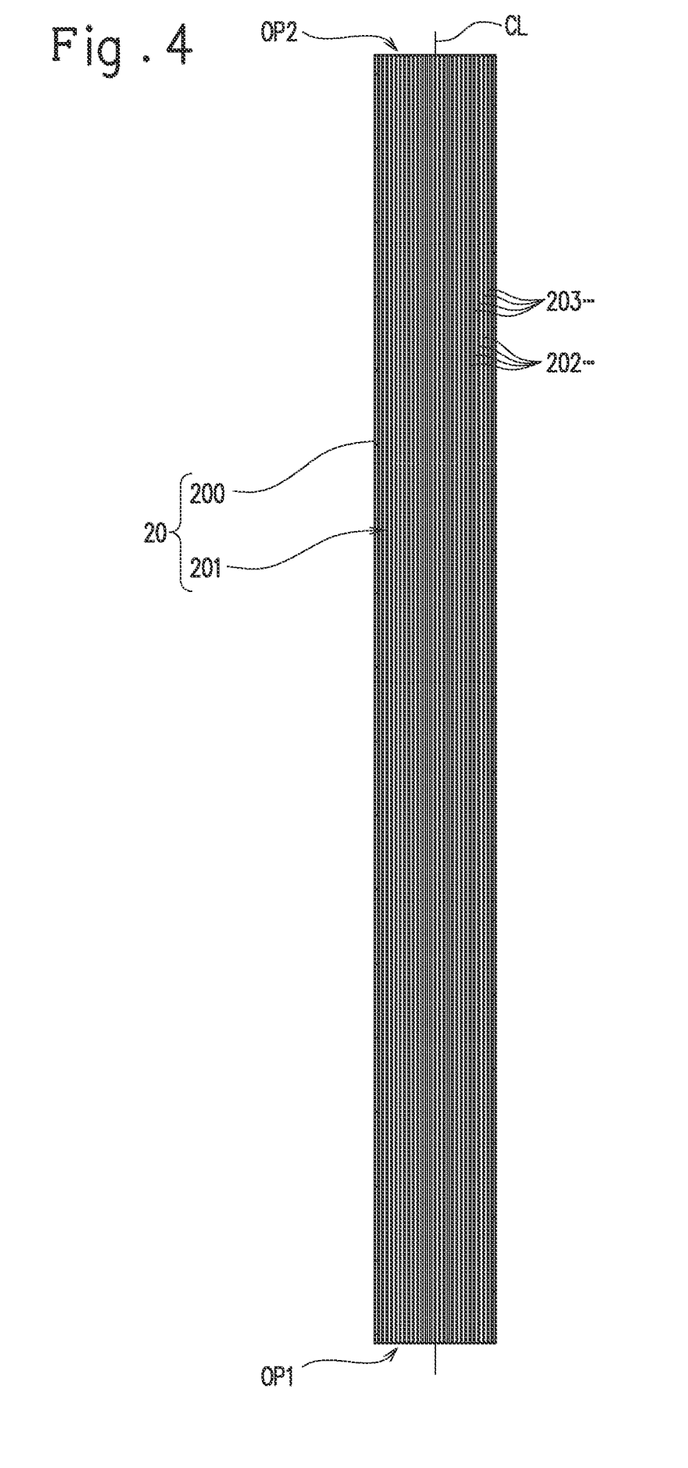
FIG. 4 is a cross-sectional view of an ink reservoir included in the pen according to the embodiment as viewed from a direction orthogonal to a direction in which a center axis of a casing member extends.

As shown in FIG. 4, the ink reservoir 20 includes a tubular casing member 200 having liquid blocking properties and an ink occlusion material 201 disposed inside the casing member 200.

The casing member 200 has a first opening end OP1 disposed on one end side in a direction in which a center axis CL of the casing member 200 (hereinafter referred to as the axial direction of the pen) extends, and a second opening end OP2 disposed on the other end side opposite to the first opening end OP1. The casing member 200 is disposed to have the first opening end OP1 facing the pen tip section 21 (see FIG. 3). As the casing member 200, a resin material molded into a tubular shape or a resin film material formed into a tubular shape can be employed. In this embodiment, a resin film material formed into a tubular shape is employed as the casing member 200.

The ink occlusion material 201 includes multiple fibers 202 disposed inside the casing member 200. Chemical fibers such as polyester fibers or acetate fibers, and natural fibers can be employed as the fibers 202. In this embodiment, polyester fibers subjected to crimping process are employed as the fibers 202. Note that the crimping process herein means a process to impart a crimp (a twist) to the fibers.

The multiple fibers 202 respectively have one ends disposed at a position corresponding to the first opening end OP1 or the second opening end OP2 of the casing member 200. Also, the multiple fibers 202 respectively have other ends disposed at a position corresponding to the first opening end OP1 or the second opening end OP2 of the casing member 200.

In this embodiment, the multiple fibers 202 are set to have a length equal to or substantially equal to the entire length of the casing member 200 (i.e., the length of the casing member 200 in the axial direction of the pen) and extend in the same direction as the center axis CL of the casing member 200. In this embodiment, the multiple fibers 202 extend straight or substantially straight in the axial direction of the pen. With this configuration, one ends of the multiple fibers 202 are disposed at the position corresponding to the first opening end OP1, and the other ends of the multiple fibers 202 are disposed at the position corresponding to the second opening end OP2.

Figure 5:
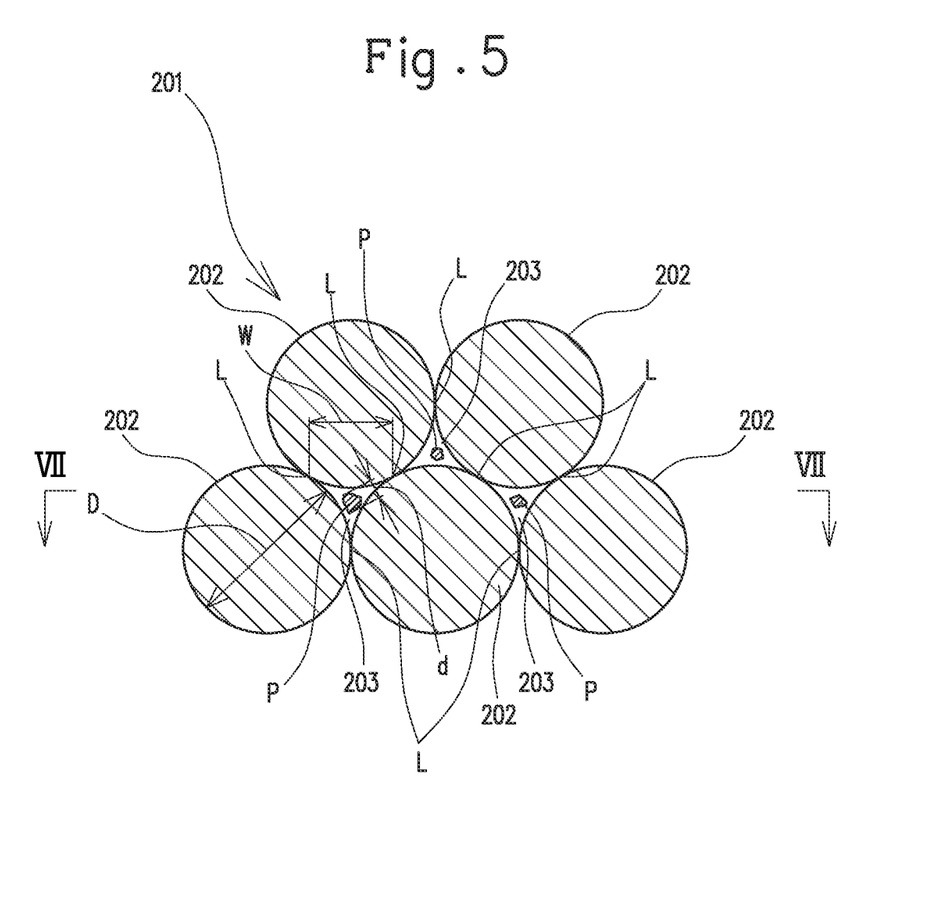
FIG. 5 is a partial enlarged cross-sectional view of the ink reservoir included in the pen according to the embodiment as viewed from the direction in which the center axis of the casing member extends.

The multiple fibers 202 are held in a bundle form and densely disposed inside the casing member 200. With this configuration, minute spaces 203 which the ink enters are formed among the fibers 202, as shown in FIG. 5. That is, the minute spaces 203 are formed by a plurality of fibers 202 present around the minute spaces 203. With this configuration, the minute spaces 203 are formed along the fibers 202. That is, the minute spaces 203 are formed along the entire length of the ink reservoir 20 in the axial direction of the pen.

A size of the minute spaces 203 as viewed from the axial direction of the pen is set to be larger than a maximum particle size d of the decorative particles P included in the ink. The size of the minute spaces 203 formed among the fibers 202 is determined according to an outer diameter D of the fibers 202 that forms the ink occlusion material 201.

Specifically, in a state where the multiple fibers are bundled in a dense state, adjacent fibers 202, 202 are held in line contact with each other so that the fibers 202 in line contact with each other define the minute spaces 203. That is, the plurality of fibers 202 are present around the minute spaces 203. At the same time, there are a plurality of contact lines L through which each adjacent fibers 202, 202 among the plurality of fibers 202 are in contact with each other. The distance between each adjacent ones of the contact lines L around the minute spaces 203 is determined according to the outer diameter D of the fibers 202.

That is, there is such a relationship that the larger the diameter D of the fibers 202, the wider the distance between the contact lines L, L adjacent to each other around the minute spaces 203, and the smaller the diameter D of the fibers 202, the smaller the distance between the contact lines L, L adjacent to each other around the minute spaces 203.

The distance between each adjacent ones of the contact lines L, L is a width W of planes or curves that form peripheries to define the minute spaces 203. Accordingly, the larger the diameter D of the fibers 202, the larger the size of the minute spaces 203, and the smaller the diameter D of the fibers 202, the smaller the size of the minute spaces 203.

Accordingly, the diameter D of the fibers 202 is determined according to the particle size d of the decorative particles P included in the ink. Note that the actual shape of the cross section of the fibers 202 may not be a circle, but the cross section of the fibers 202 is herein schematically illustrated as a perfect circle.

Figure 6:
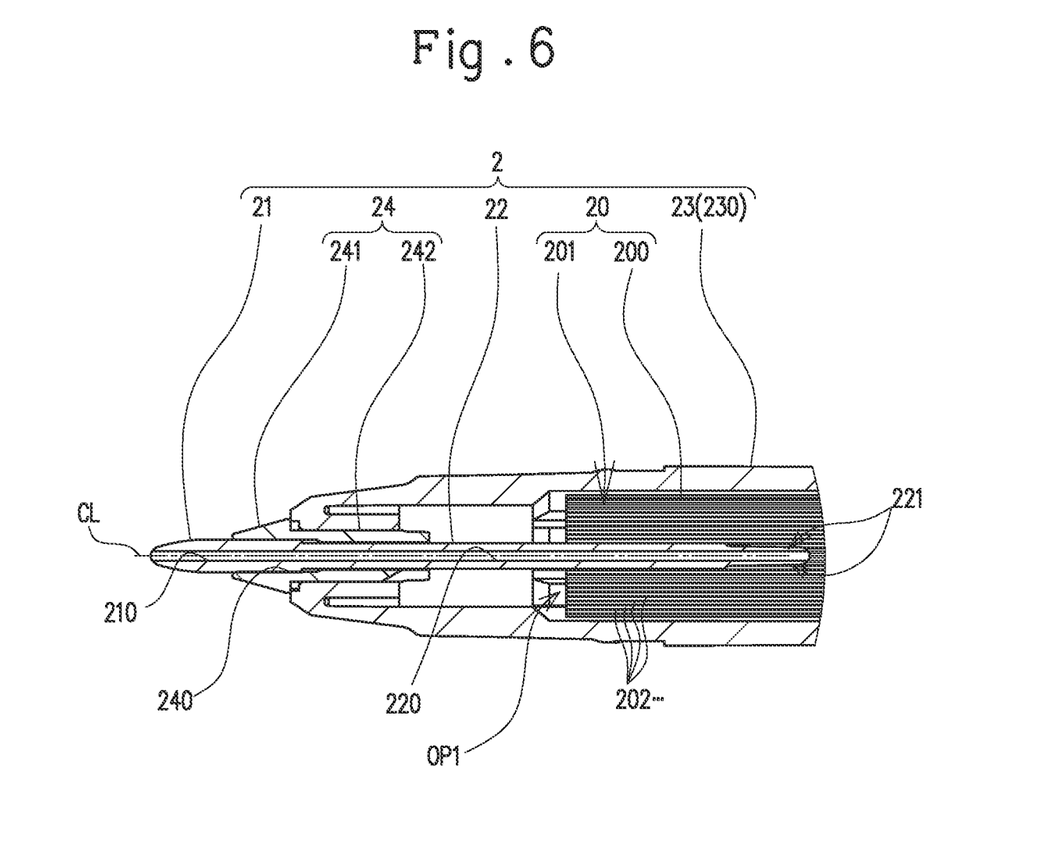
FIG. 6 is a partial enlarged view of the pen according to the embodiment, specifically an enlarged view of a VI area in FIG. 3.

As shown in FIG. 6, the pen tip section 21 has a proximal end to which the ink of the ink reservoir 20 is supplied, and a distal end opposite to the proximal end and configured to be brought into contact with the ink application target. The pen tip section 21 according to this embodiment includes an ink through hole 210 penetrating from the proximal end to the distal end.

More specifically, the pen tip section 21 has a rod shaped appearance. Accordingly, one end in an axial direction of the pen tip section 21 is the proximal end to which the ink of the ink reservoir 20 is supplied, and the other end in the axial direction of the pen tip section 21 is the distal end that is brought into contact with the ink application target.

The pen tip section 21 of this embodiment is formed by subjecting a resin material (plastic in this embodiment) to an injection molding to thereby mold the resin material into a hollow rod shape (i.e., tubular shape) having the ink through hole 210 extending through the center of the pen tip section 21.

The ink through hole 210 of the pen tip section 21 extends in the axial direction of the pen tip section 21 (i.e., the axial direction of the pen). The ink through hole 210 of the pen tip section 21 is set to have such a size as to enable the decorative particles P included in the ink to move therethrough in the axial direction of the pen. That is, the ink through hole 210 of the pen tip section 21 is set to be larger than the maximum particle size d of the decorative particles P included in the ink and formed along the entire length in the axial direction of the pen of the pen tip section 21. Accordingly, the ink through hole 210 of the pen tip section 21 is opened at one end face and the other end face in the axial direction of the pen.

A plurality of protrusions (not shown) protruding toward the center from an inner peripheral wall defining the ink through hole 210 are located at intervals in a circumferential direction in the pen tip section 21. Thereby, spaces are formed between the protrusions to serve as minute gaps so that the ink is supplied to the pen tip section 21 (i.e., the pen tip) by the capillary action of the gaps.

The ink guide part 22 has a proximal end to which the ink is supplied from the ink reservoir 20, and a distal end opposite to the proximal end. The ink guide part 22 according to this embodiment includes an ink through hole 220 penetrating from the proximal end to the distal end.

More specifically, the ink guide part 22 has a rod shaped appearance. Accordingly, one end in an axial direction of the ink guide part 22 is the proximal end to which the ink of the ink reservoir 20 is supplied, and the other end in the axial direction of the ink guide part 22 is the distal end that is connected to the pen tip section 21.

The ink through hole 220 of the ink guide part 22 extends in the axial direction of the ink guide part 22 (i.e., the axial direction of the pen). The ink through hole 220 of the ink guide part 22 is set to have such a size as to enable the decorative particles P included in the ink to move therethrough in the axial direction of the pen. That is, the ink through hole 220 of the ink guide part 22 is set to be larger than the maximum particle size d of the decorative particles P included in the ink and formed along the entire length in the axial direction of the pen of the ink guide part 22. Accordingly, the ink through hole 220 of the ink guide part 22 is opened at one end face and the other end face in the axial direction of the pen.

In this embodiment, the ink guide part 22 includes a plurality of slits 221 disposed at intervals in the peripheral direction in a given area including the one end. The plurality of slits 221 extend in the axial direction of the pen and extend through the ink guide part 22 in a radial direction to be in communication between the inside and the outside of the ink guide part 22. The ink guide part 22 is thereby configured to enable the ink to flow into the ink through hole 220 not only from the opening at the one end face but also from the plurality of slits 221.

A plurality of protrusions (not shown) protruding toward the center from an inner peripheral wall defining the ink through hole 220 are located at intervals in a circumferential direction in the ink guide part 22. Thereby, spaces are formed between the protrusions to serve as minute gaps so that the ink is supplied to the ink guide part (i.e., the pen tip) by the capillary action of the gaps.

In this embodiment, the ink guide part 22 is formed continuously and integrally with the pen tip section 21. That is, the outer shape of the ink guide part 22 and the hole shape of the ink through hole 220 are respectively set to be the same as the outer shape of the pen tip section 21 and the hole shape of the ink through hole 210, and the distal end of the ink guide part 22 is connected to the proximal end of the pen tip section 21. Thereby, the ink through hole 210 of the pen tip section 21 and the ink through hole 220 of the ink guide part 22 are continuous with each other. The proximal end side of the ink guide part 22 is inserted into the ink occlusion material 201 of the ink reservoir 20.

Returning to FIG. 3, the outer covering 23 includes a tubular barrel 230 having one end and the other end opposite to the one end, and a tail part 231 that closes the one end of the barrel 230. The ink reservoir 20 is housed in the barrel 230 with its center axis coaxially or substantially coaxially with the center axis CL of the casing member 200.

As shown in FIG. 6, the holder 24 includes a through hole 240 through which the pen tip section 21 is inserted, that is, through which the pen tip section 21 is inserted to have a tip side extending to the outside. In this embodiment, the pen tip section 21 and the ink guide part 22 are integrally molded so that the pen tip section 21 and the ink guide part 22 are inserted through the through hole 240 of the holder 24.

More specifically, the holder 24 includes a large diameter tubular part 241 and a small diameter tubular part 242 that has an outer diameter smaller than that of the large diameter tubular part 241 and is continuous with the large diameter tubular part 241.

The large diameter tubular part 241 has a circular truncated cone shaped appearance and has a large diameter end face and a small diameter end face at the positions at which they face each other in the axial direction of the pen. The small diameter tubular part 242 is coaxially connected to the large diameter end face of the large diameter tubular part 241.

The large diameter end face of the large diameter tubular part 241 is set to have a diameter larger than the other end opening of the barrel 230 of the outer covering 23. The outer diameter of the small diameter tubular part 242 is set to be substantially equal to the other end opening of the barrel 230 of the outer covering 23. Accordingly, the small diameter tubular part 242 is pressed into the other end opening of the barrel 230 of the outer covering 23, thereby the holder 24 is attached to the outer covering 23 with the large diameter end face of the large diameter tubular part 241 contacting the other end of the barrel 230.

The diameter of an inner hole of the large diameter tubular part 241 corresponds to an outer diameter of the pen tip section 21. In contrast, the diameter of an inner hole of the small diameter tubular part 242 corresponds to an outer diameter of the ink guide part 22. The inner hole of the large diameter tubular part 241 and the inner hole of the small diameter tubular part 242 are coaxially continuous with each other.

That is, the inner hole of the large diameter tubular part 241 and the inner hole of the small diameter tubular part 242 that are continuous with each other thus form the through hole 240 into which the pen tip section 21 and the ink guide part 22 that are integrally molded are inserted. Thereby, the pen tip section 21 and the ink guide part 22 are held by the holder 24 while being inserted through the through hole 240.

As described above, the pen 1 according to this embodiment includes the ink reservoir 20 that stores the ink including the decorative particles P, and the pen tip section 21 to which the ink is supplied from the ink reservoir 20. The ink reservoir 20 includes the tubular casing member 200 having liquid blocking properties, and the ink occlusion material 201 disposed inside the casing member 200. The casing member 200 has the first opening end OP1 on one end side in the axial direction of the pen, and the second opening end OP2 on the other end side opposite to the first opening end OP1. The casing member 200 is disposed to have the first opening end OP1 facing the pen tip section 21. The ink occlusion material 201 includes the multiple fibers 202 disposed inside the casing member 200. The multiple fibers 202 respectively have one ends disposed at a position corresponding to the first opening end OP1 or the second opening end OP2 of the casing member 200. The multiple fibers 202 respectively have the other ends disposed at the position corresponding to the first opening end OP1 or the second opening end OP2 of the casing member 200.

According to the pen 1 having the aforementioned configuration, the ink including the decorative particles P is occluded (stored) by the ink occlusion material 201 without leaking to the outside since the ink reservoir 20 includes the tubular casing member 200 having liquid blocking properties and the ink occlusion material 201 disposed inside the casing member 200.

The ink occluded by the ink occlusion material 201 is supplied to the pen tip section 21 as the ink at the pen tip section is being consumed. That is, the ink at the pen tip section 21 is consumed due to the application of the ink to the ink application target, but the ink including the decorative particles P occluded by the ink occlusion material 201 is supplied to the pen tip section 21.

In the ink occlusion material 201 of the pen having the aforementioned configuration, there is no end face of the fibers 202 in a middle portion inside the casing member 200 in the axial direction of the pen, that is, in a portion between the first opening end OP1 and the second opening end OP2 since the one ends of the multiple fibers 202 are disposed at the position corresponding to the first opening end OP1 or the second opening end OP2 of the casing member 200, and the other ends of the multiple fibers 202 included in the ink occlusion material 201 are disposed at the position corresponding to the first opening end OP1 or the second opening end OP2 of the casing member 200.

Figure 7:
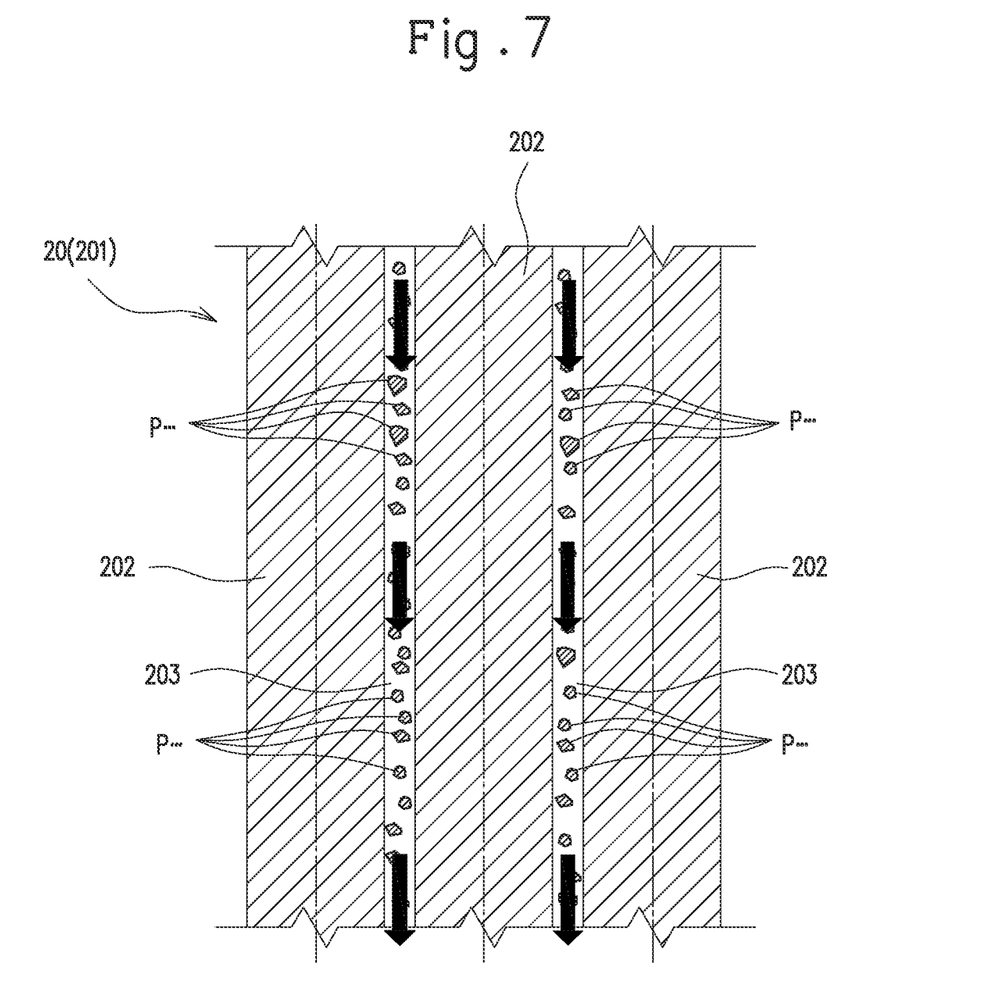
FIG. 7 is a partial enlarged cross-sectional view of the ink reservoir included in the pen according to the embodiment taken along a line VII-VII in FIG. 5 with a schematic illustration of flow of ink.

Therefore, when the ink is supplied to the pen tip section 21, the entire ink including the decorative particles P can move from the second opening end OP2 side toward the first opening end OP1 side of the casing member 200, while the decorative particles P included in the ink are not caught by end faces of the fibers 202 in a middle portion of the casing member as shown in FIG. 7. Accordingly, the entire ink including the decorative particles P is supplied to the pen tip section 21. That is, the reduction in the amount of the decorative particles P supplied to the pen tip section 21 can be suppressed during the supply of the ink to the pen tip section 21.

Thereby, the decorative particles P included in the ink can be stably applied to the ink application target during the use of the pen 1 (i.e., when the ink is applied to the ink application target).

Further, the entire ink including the decorative particles P smoothly moves (flows) toward the pen tip section 21 since, in this embodiment, the multiple fibers 202 extend in the same direction as that of the center axis CL of the casing member 200, the one ends of the multiple fibers 202 are disposed at the position corresponding to the first opening end OP1, and the other ends of the multiple fibers are disposed at the position corresponding to the second opening end OP2.

Specifically, since the multiple fibers 202 extend in the same direction as that of the center axis CL of the casing member 200, the minute spaces formed among the fibers 202 extend in the same direction as that of the center axis CL of the casing member 200. That is, the minute spaces 203 formed among the fibers 202 extend along the fibers 202.

Thereby, the entire ink including the decorative particles P smoothly moves (flows) from the second opening end OP2 side toward the first opening end OP1 side of the casing member 200. Accordingly, the stable supply of the ink to the pen tip section 21 is enabled so that the decorative particles P included in the ink are stably applied to the ink application target during the use of the pen 1 (i.e., when the ink is applied to the ink application target).

The present invention is not limited to the aforementioned embodiment and appropriate modifications can be made without departing from the gist of the present invention.

Although not specifically mentioned in the aforementioned embodiment, the pen 1 having the aforementioned configuration may be a pen as a makeup instrument used for makeup or may be a pen as a writing instrument (stationery) for writing.

In the aforementioned embodiment, the multiple fibers 202 are set to have a length corresponding to the entire length of the casing member 200 in the axial direction of the pen, and respectively disposed to have the one ends corresponding to the first opening end OP1 and the other ends corresponding to the second opening end OP2, but the present invention is not limited thereto. For example, it can be configured such that the fibers 202 are turned back at least at one place, and the fibers 202 respectively have both ends located at the positons respectively corresponding to the first opening end OP1 or the second opening end OP2. In this case, there is no need to arrange the multiple fibers 202 in the same form. For example, the fibers 202 turned back at least at one place and the fibers 202 extending straight without being turned back can be mixed in the multiple fibers 202 forming the ink occlusion material 201. That is, any forms can be employed as long as both ends (i.e., the end faces) of the fibers 202 are not located in a middle portion of the casing member 200.

Also in this case, it is a matter of course that, in order to enable the smooth flow of the ink, the fibers 202 extend in the axial direction of the pen between the first opening end OP1 and the second opening end OP2 of the casing member 200 (i.e., the length direction of the fibers is parallel to the axial direction of the pen) in the same manner as the aforementioned embodiment.

In the case where the fibers 202 are turned back at least at one place, it is preferable that each of the folded portions at which the fibers 202 are turned back be disposed at the position corresponding to the opening end (the first opening end OP1 or the second opening end OP2) of the casing member 200.

In particular, in a case where the fibers 202 are folded into two (turned back at one place), it is preferable that the both ends of the fibers 202 be disposed at the position corresponding to the first opening end OP1 on the pen tip section 21 side, and the folded portion formed at one place be disposed at the position corresponding to the second opening end OP2.

Figure 8:
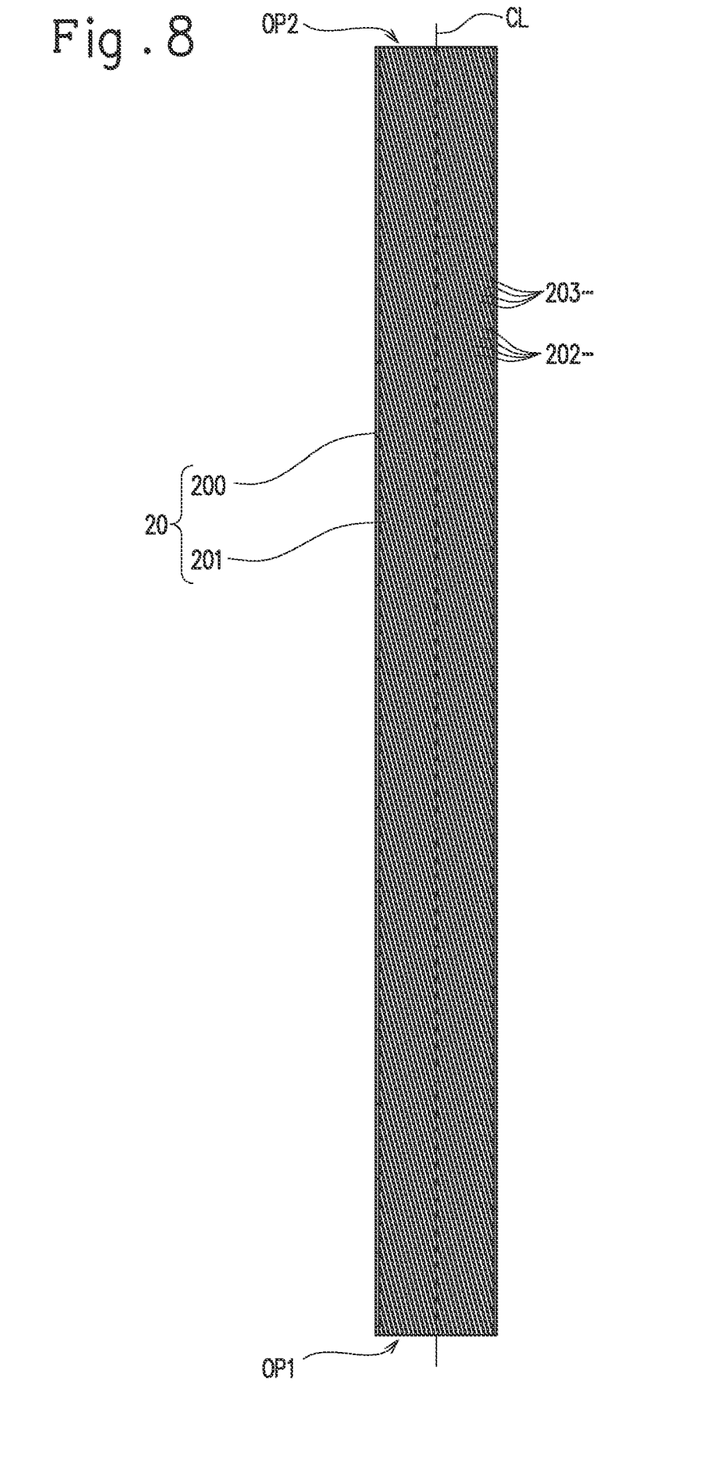
FIG. 8 is a cross-sectional view of the ink reservoir included in a pen according to another embodiment as viewed from a direction orthogonal to a direction in which a center axis of a casing member extends.

In the aforementioned embodiment, the multiple fibers 202 extend straight or substantially straight in the axial direction of the pen and are respectively disposed to have the one ends corresponding to the first opening end OP1 and the other ends corresponding to the second opening end OP2, but the present invention is not limited thereto. For example, as shown in FIG. 8, it can be configured such that the multiple fibers 202 extend in the axial direction of the pen, and all the multiple fibers 202 are bundled into a group and twisted into a spiral shape about a reference line extending in the axial direction of the pen. Also in this case, the one ends of the multiple fibers 202 are disposed at the position corresponding to the first opening end OP1, and the other ends of the multiple fibers 202 are disposed at the position corresponding to the second opening end OP2.

Figure 9:
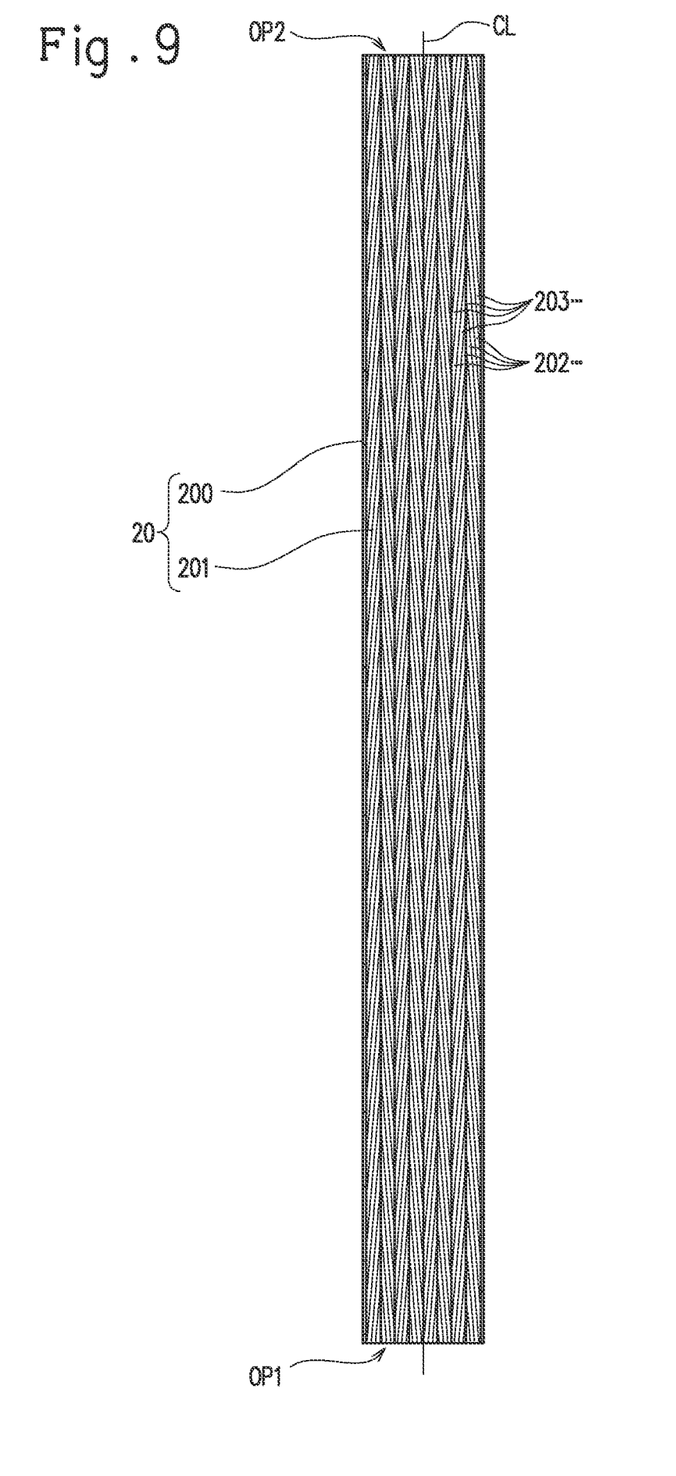
FIG. 9 is a cross-sectional view of the ink reservoir included in a pen according to still another embodiment as viewed from a direction orthogonal to a direction in which a center axis of a casing member extends.

As shown in FIG. 9, it also can be configured that the multiple fibers 202 extend in the axial direction of the pen and are bundled into groups, each of which includes a certain number of fibers, and each of the groups of fibers is twisted into a spiral shape about a reference line extending in the axial direction of the pen. Also in this case, the one ends of the multiple fibers 202 are disposed at the position corresponding to the first opening end OP1, and the other ends of the multiple fibers 202 are disposed at the position corresponding to the second opening end OP2.

According to these configurations, the minute spaces 203 among the fibers 202 are formed in a spiral shape extending in the axial direction of the pen. That is, the minute spaces 203 among the fibers 202 are formed in a spiral shape along the entire length of the casing member 200 in the axial direction of the pen. Thereby, the entire ink smoothly moves (flows) from the second opening end OP2 side toward the first opening end OP1 side of the casing member 200 through spiral passages. Accordingly, the stable supply of the ink to the pen tip section 21 is enabled so that the decorative particles P included in the ink can be stably applied to the ink application target during the use of the pen 1 (i.e., when the ink is applied to the ink application target).

In the aforementioned embodiment, the pen tip section 21 and the ink guide part 22 are integrally formed with each other, and thereby the ink through holes 210, 220 thereof are formed in a continuous tubular shape, but the present invention is not limited thereto. For example, in the case where the pen tip section 21 and the ink guide part 22 are integrally formed with each other, at least one ink through groove extending in the axial direction of the pen can be formed on the outer circumference instead of the ink through holes 210, 220. This configuration enables the ink including the decorative particles P to be guided by the ink through groove and supplied to the pen tip of the pen tip section 21.

In this case, the ink through groove can be widened from the center side toward the circumferential side or can be formed with the same width from the center side toward the circumferential side. Further, in a case where a plurality of ink through grooves are disposed in the pen tip section 21 and the ink guide part 22, the plurality of ink through grooves can be located at uniform intervals around the pen tip section 21 and the ink guide part 22, or can be located at non-uniform intervals around the pen tip section 21 and the ink guide part 22.

In the aforementioned embodiment, the pen tip section 21 and the ink guide part 22 are integrally formed with each other, but the present invention is not limited thereto. For example, the pen tip section 21 and the ink guide part 22 can be formed as separate parts. Needless to say, however, it is configured such that the ink from the ink guide part 22 can be transferred to the pen tip section 21.

The pen according to one embodiment of the present invention includes an ink reservoir that stores an ink including decorative particles; and a pen tip section to which the ink is supplied from the ink reservoir; the ink reservoir including a tubular casing member having liquid blocking properties, and an ink occlusion material disposed inside the casing member; the casing member having a first opening end and a second opening end opposite to the first opening end in a direction in which a center axis of the casing member extends, in which the first opening end is disposed to face the pen tip section; the ink occlusion material including multiple fibers disposed inside the casing member; the multiple fibers respectively having one ends disposed at a position corresponding to the first opening end or the second opening end of the casing member; and the multiple fibers respectively having other ends disposed at a position corresponding to the first opening end or the second opening end of the casing member.

According to the aforementioned configuration, the ink including the decorative particles is occluded (stored) by the ink occlusion material without leaking to the outside since the ink reservoir includes the tubular casing member having liquid blocking properties and the ink occlusion material disposed inside the casing member.

The ink occluded by the ink occlusion material is supplied to the pen tip section as the ink at the pen tip section is being consumed. That is, the ink at the pen tip section is consumed due to the application of the ink to the ink application target, but the ink including the decorative particles occluded by the ink occlusion material is supplied to the pen tip section.

In the ink occlusion material of the pen having the aforementioned configuration, there is no ends (i.e., no end faces) of the fibers in a middle portion inside the casing member in a direction in which the center axis of the casing member extends, since the one ends of the multiple fibers are disposed at the position corresponding to the first opening end or the second opening end of the casing member, and the other ends of the multiple fibers are disposed at the position corresponding to the first opening end or the second opening end of the casing member.

Therefore, when the ink is supplied to the pen tip section, the entire ink including the decorative particles can move from the second opening end side toward the first opening end side of the casing member, while the decorative particles included in the ink are not caught by end faces of the fibers in a middle portion of the casing member. That is, the reduction in the amount of the decorative particles supplied to the pen tip section can be suppressed during the supply of the ink to the pen tip section.

Thereby, the decorative particles included in the ink can be stably applied to the ink application target during the use of the pen (i.e., when the ink is applied to the ink application target).

As one form of the present invention, it can be configured such that the multiple fibers extend in the same direction as that of the center axis of the casing member, the one ends of the multiple fibers are disposed at the position corresponding to the first opening end, and the other ends of the multiple fibers are disposed at the position corresponding to the second opening end.

This configuration enables the entire ink including the decorative particles to smoothly move (flow) toward the pen tip section.

Specifically, since the multiple fibers extend in the same direction as that of the center axis of the casing member, the minute spaces formed among the fibers extend in the same direction as that of the center axis of the casing member. That is, the minute spaces among the fibers are formed along the fibers.

Thereby, the entire ink smoothly moves (flows) from the second opening end side toward the first opening end side of the casing member. Accordingly, the stable supply of the ink to the pen tip section is enabled so that the decorative particles included in the ink are stably applied to the ink application target during the use of the pen (i.e., when the ink is applied to the ink application target).

As described above, the pen according to one form of the present invention can produce an excellent effect of enabling, even for the ink including the decorative particles, the stable supply of the ink including the decorative particles.

REFERENCE SIGNS LIST

1: Pen
2: Pen body
3: Cap
20: Ink reservoir
21: Pen tip section
22: Ink guide part
23: Outer covering
24: Holder
200: Casing member
201: Ink occlusion material
202: Fiber
203: Minute space
210: Ink through hole
220: Ink through hole
221: Slit
230: Barrel
231: Tail part
240: Through hole
241: Large diameter tubular part
242: Small diameter tubular part
D: Outer diameter
d: Particle size
L: Contact line
OP1: First opening end
OP2: Second opening end
P: Decorative particles
W: Width

The invention claimed is:

1. A pen comprising:
an ink reservoir that stores an ink comprising decorative particles; and
a pen tip section to which the ink is supplied from the ink reservoir;
the ink reservoir comprising a tubular casing member having liquid blocking properties, and an ink occlusion material disposed inside the tubular casing member;
the tubular casing member having a first opening end and a second opening end opposite to the first opening end in a direction in which a center axis of the tubular casing member extends, in which the first opening end is disposed to face the pen tip section;
the ink occlusion material comprising multiple fibers disposed inside the tubular casing member;
the multiple fibers respectively having one ends disposed at a position corresponding to the first opening end or the second opening end of the tubular casing member; and
the multiple fibers respectively having other ends disposed at a position corresponding to the first opening end or the second opening end of the tubular casing member.

2. The pen according to claim 1, wherein
the multiple fibers extend in the same direction as that of the center axis of the tubular casing member,
the one ends of the multiple fibers are disposed at the position corresponding to the first opening end, and
the other ends of the multiple fibers are disposed at the position corresponding to the second opening end.

3. The pen according to claim 1, wherein
the decorative particles comprised in the ink are composed of glass, mineral, metal, fiber, or resin in fine powder form, fine particulate form, or fine flake form.

4. The pen according to claim 1, wherein
the multiple fibers are held in a single bundle form and disposed inside the tubular casing member.

5. The pen according to claim 1, wherein
minute spaces which the ink enters are formed among the multiple fibers.

6. The pen according to claim 1, wherein
each adjacent ones of the multiple fibers are held in line contact with each other and the fibers held in line contact with each other define the minute spaces.

7. The pen according to claim 1, wherein
the multiple fibers a fiber that is turned back at least at one place.

8. The pen according to claim 1, wherein
the multiple fibers are bundled into groups, each of which comprises a certain number of fibers, and each of the groups of fibers is twisted into a spiral shape about a reference line extending in an axial direction of the pen.

* * * * *

UNITED STATES PATENT AND TRADEMARK OFFICE
CERTIFICATE OF CORRECTION

| | |
|---|---|
| PATENT NO. | : 11,724,534 B2 |
| APPLICATION NO. | : 17/614245 |
| DATED | : August 15, 2023 |
| INVENTOR(S) | : Miyoko Tsuda et al. |

It is certified that error appears in the above-identified patent and that said Letters Patent is hereby corrected as shown below:

On the Title Page

Column 2, Item (57) Abstract, Line 1, after "A" delete "is a"

In the Claims

Column 12, Line 54, Claim 7, after "fibers" insert -- comprise --

Signed and Sealed this
Tenth Day of October, 2023

Katherine Kelly Vidal
*Director of the United States Patent and Trademark Office*